UNITED STATES PATENT OFFICE.

JOHN W. MEIER, OF SHULLSBURG, WISCONSIN.

PROCESS OF CONCENTRATING AND SEPARATING ORES.

SPECIFICATION forming part of Letters Patent No. 497,804, dated May 23, 1893.

Application filed January 22, 1892. Serial No. 418,960½. (No specimens.)

*To all whom it may concern:*

Be it known that I, JOHN W. MEIER, a citizen of the United States, residing at Shullsburg, in the county of Lafayette and State of Wisconsin, have invented certain new and useful Improvements in the Process of Concentrating and Separating Ores, of which the following is a full, clear, and exact description.

The object of my invention is to render the separation of iron ores, or iron oxides, whether natural or artificially produced, of iron sulphides, or highly ferruginous substances generally, from any other ores, or ores of other metals, and minerals, more perfect and more easily carried out. It consists in the process of which the following is a description.

The concentration and separation of ores has heretofore been carried out in the following manner:—The ores have been crushed more or less finely and then washed on jigs, tables, or other apparatus, whereby the different ores are separated according to their relative specific gravities, water being generally used as the moving agent, although currents or jets of air, under pressure, have been used to effect the same purpose. When the ores, minerals or substances vary greatly in their relative specific gravities, the separation is readily accomplished by this method; but when they vary but little in specific gravity the separation will be imperfect and in many cases impossible. The ores of iron, iron oxides, iron sulphides and all highly ferruginous substances, being very heavy, it is ordinarily very difficult, sometimes even impossible, to separate them from the ores of copper, zinc, or from the ores of other metals generally, and my improved method is intended to remedy this difficulty and to successfully accomplish the separation.

In the practice of my improved method, I first convert all the iron ores, iron oxides, whether natural or artificially produced, all other ferruginous substances, all concentrates of said ores, oxides and ferruginous substances, into some highly magnetic combination of iron, preferably magnetic oxide of iron. To effect this conversion, in the case of iron ores, I employ the following process:—The ores of copper, zinc, or any other metals, as hereinbefore enumerated, which are found associated with iron ores, iron oxides and other ferruginous substances, are placed in a suitable furnace or retort, or any other approved receptacle, mixed with the proper quantity of coal, coke, or other highly carbonaceous matter and heat applied thereto until the ferruginous compounds contained therein are converted into the sesqui-oxide of iron. I take this mixture, in which the ferruginous substances are in the form of the sesqui-oxide, and mix therewith the proper proportion of highly carbonaceous matter and then place the whole in a suitable receptacle and subject the same to a current of heated reducing gases, consisting largely of carbonic oxide gas. By this means the sesqui-oxide of iron is reduced to magnetic oxide of iron, other magnetic combinations of iron, and in part, to metallic iron. While in this form I subject the mixture, as a whole, to a treatment by any of the approved forms of magnetic separators, by which means the magnetic oxides of iron, the particles of metallic iron, or other magnetic combinations of iron, are readily separated from the other associated substances, and the ores of zinc, copper, &c., left comparatively free of any substances containing iron in any appreciable proportion.

To accomplish the separation in the case of ores containing sulphides of iron or pyrites of iron, I first convert the sulphides or pyrites, by calcination, roasting or chemical means, into an oxide of iron, and then subsequently treat the oxide thus obtained in the manner already described.

I claim—

The herein-described method for the concentration of ferruginous compounds in ores and their separation from non-magnetic metals associated therewith in the ores, consisting, first, in converting the various ferruginous compounds into the sesqui-oxide of iron, by subjecting the ore to the application of heat; second, in reducing this oxide of iron to a magnetic oxide of iron, by mixing the ore with some highly carbonaceous substance and subjecting the whole to a current of heated reducing gases consisting largely of carbonic oxide gas; and, third, in effecting a separation of the ferruginous compounds from the associated non-magnetic metals, minerals, and other substances, by subjecting the resulting mixture to the action of a magnet or magnets, substantially as described.

In testimony whereof I have affixed my signature, in presence of two witnesses, this 24th day of November, 1891.

JOHN W. MEIER.

Witnesses:
E. E. TRISSOHILM,
OTTO PFEIFFER.